United States Patent [19]
O'Donnell

[11] 3,877,799
[45] Apr. 15, 1975

[54] METHOD OF RECORDING THE FIRST FRAME IN A TIME INDEX SYSTEM

[75] Inventor: Leopold Henry O'Donnell, Toronto, Ontario, Canada

[73] Assignee: Her Majesty the Queen in right of Canada as represented by the Secretary of State, Ottawa, Canada

[22] Filed: Feb. 6, 1974

[21] Appl. No.: 439,918

[52] U.S. Cl. .................................. 352/92; 354/105
[51] Int. Cl. ........................................... G03b 21/50
[58] Field of Search ...................... 352/92; 354/105

[56] References Cited
UNITED STATES PATENTS

| | | | |
|---|---|---|---|
| 3,449,046 | 6/1969 | White | 352/92 |
| 3,594,581 | 7/1971 | Yamashita | 352/92 |
| 3,603,675 | 9/1971 | Woodruff | 352/92 |
| 3,811,768 | 5/1974 | Zahn | 352/92 |

*Primary Examiner*—Monroe H. Hayes
*Attorney, Agent, or Firm*—Alan Swabey; Robert E. Mitchell

[57] ABSTRACT

This invention relates to a system for recording an identification code at the beginning frames of each shooting sequence on film in a movie camera. In applicant's co-pending application Ser. No. 371,492, apparatus is described which records indexing information on the edge of a film in a movie camera. The apparatus comprises a plurality of light sources adjacent the film edge and in a position in a camera to expose the film edge. The sources are disposed across the film edge so that the indexing signal produced by the sources will be exposures in the direction of travel of the film. In the above application, it is proposed two successive fifteens be used to identify the first frame of a shooting sequence. The present application teaches a system for producing this code, or other codes, which will be recorded adjacent to the beginning frames of a shooting sequence. The system comprises a detector for detecting the camera motor speed and for providing an output when the motor reaches the operating speed of the camera. The output controls a means for activating the light sources (which are preferably LEDS) on receiving the output from the detector. The system also includes means for measuring elapsed frames and for deactivating the light source driving means after a predetermined number of frames elapses, preferably four frames.

8 Claims, 2 Drawing Figures

3,877,799

METHOD OF RECORDING THE FIRST FRAME IN A TIME INDEX SYSTEM

BACKGROUND OF THE INVENTION

1. Field of the Invention

This invention relates to a system for recording an identification code on the beginning frames of each shooting sequence on a film in a movie camera. More specifically, this invention relates to such a system used in conjunction with a four track format for recording indexing information on an edge of movie film strips, wherein the first frame identification information is recorded on the edge of the film strip adjacent the beginning frames of each shooting sequence.

2. Description of the Prior Art

Applicant's co-pending application Ser. No. 371,492, filed June 19, 1973 describes a method and apparatus for recording indexing information on movie film strips which apparatus uses LEDS or other light sources to expose a binary code on the film's edge. The method and apparatus are also described in British Kinematography Sound and Television, Vol. 55, No. 9, September 1973, pages 292 et seq., by Leopold O'Donnell. The binary code represents the time, in hours, minutes and seconds, when shooting place in the frames adjacent the coded edges. A bit of information, or a plurality of bits, is impressed on the edges adjacent two adjacent frames. Indexing information additional to or other than time information can be recorded. Thus, it is possible to record frame numbers instead of time.

In one embodiment of the above invention, a four track format is used, i.e., a light source with four beams of light or light sources, each with a single beam, are placed near the edge of the film and are disposed across the film edge in a direction perpendicular to the direction of travel of the film. Thus, four exposures are possible in every two frames, and the exposures will run in the direction parallel to the direction of travel of the film. In this way, four bits of information are recorded in the film edges adjacent every two frames.

In the above-mentioned system, it is preferred that the beginning frames of each shooting be identified by two groups of the binary number 15 (1,1,1,1 1,1,1,1). The instant application relates to a system for producing this code to drive the light sources at the beginning of each shooting sequence.

SUMMARY OF THE INVENTION

In accordance with the invention, a system for providing an identification code on the beginning frames of a shooting sequence on a film in a movie camera, and used in conjunction with a multitrack format apparatus for exposing indexing information on the edge of said film;

said camera comprising a driving motor;

said apparatus comprising a source with a plurality of light sources placed adjacent the film edge and disposed across said film edge;

comprises;

detecting means for detecting the speed of said driving motor;

said detecting means providing a driving signal when the driving motor reaches its operating speed;

light source activating, and elapsed frame counting means, connected to said detecting means, for connecting an activating signal to at least one of said light sources for a predetermined number of frame periods on reception of said driving signal, and for counting frames elapsed after the activating signal has been connected;

said activating signal being disconnected from said at least one of said light sources after said predetermined number of frame periods.

When used with the apparatus of the referenced application, the predetermined number of frame periods is equal to four frame periods.

Preferably, the detecting means is a tachometer, and preferably all of the sources are activated.

In a preferred embodiment, the light source activating and elapsed frame counting means comprises three D-type flip-flops, each flip-flop comprising a data input terminal, a trigger input terminal and Q and $\overline{Q}$ output terminals;

and the light source activating and elapsed frame counting means further comprises two two-input AND gates;

the system further comprises a shift pulse generator;

the output of the detecting means being connected with the data input terminal of a first one of the three flip-flops;

the Q output terminal of the first flip-flop being connected to the data input terminal of a second one of the three flip-flops;

the Q output terminal of the second flip-flop being connected to the data input terminal of a third one of the three flip-flops;

the $\overline{Q}$ output terminal of the third flip-flop being connected to one input terminal of a first one of the two AND gates;

the Q output terminal of the first flip-flop being connected to the second input terminal of the first AND gate;

the output terminal of the first AND gate being connected to one input terminal of a second one of the two AND gates;

the output terminal of the shift pulse generator being connected to the second input terminal of the second AND gate;

the output terminal of the shift pulse generator being further connected to the trigger input terminals of the first, second and third flip-flops;

the output terminal of the second AND gate being connected to the light sources to activate the light sources when an output appears at the output terminal of the second AND gate.

BRIEF DESCRIPTION OF THE DRAWINGS

The invention will be better understood by an examination of the following description, together with the accompanying drawings in which.

DETAILED DESCRIPTION OF THE DRAWINGS

Figure 1:
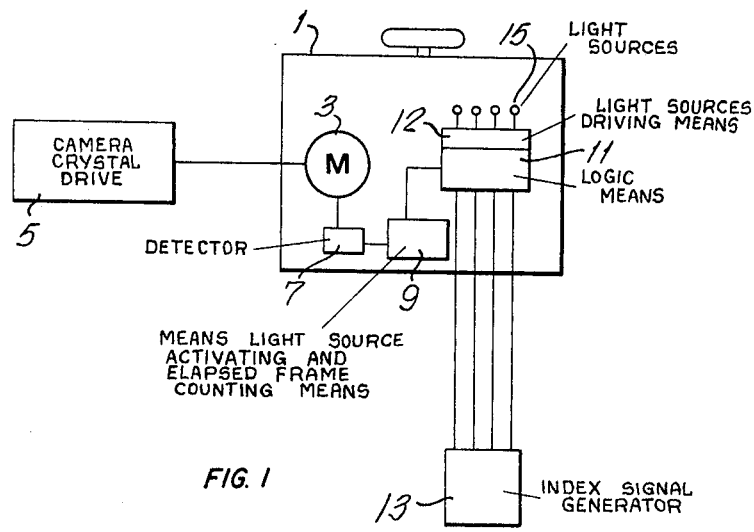
FIG. 1 is a block diagram of a camera employing the inventive system.

Referring first to FIG. 1, 1 is a movie camera adapted to be outfitted with the inventive system. The camera comprises a driving motor 3 which is driven by a crystal drive 5 as is well known in the art. The speed of the motor is detected by detector 7 which could comprise a tachometer. The detecting means provides an output only after the motor reaches the operating speed of the camera.

The output of the detector is fed to a light source activating and elapsed frame counting means 9, which provides an activating signal to the light sources and counts elapsed frames thereafter, and which is described in greater detail below, and the output of 9 drives the light beam logic means 11, which controls a light beam driving means 12. The light beam logic means is also supplied from the index signal generator 13, as described in the above-identified references, and the driving means 12, controlled by the logic means 11, activates the light sources 15. Preferably, the light sources are Light Emitting Diodes (LEDS). As in the above-identified reference, the LEDS ARE located in the camera in position to expose the index edge of the film. The LEDS are disposed across the edge to provide parallel exposures running in the direction of the movement of the film.

In accordance with the teachings in the above-mentioned references, the apparatus is a four track apparatus and four parallel light beams are supplied. It will of course be appreciated that more or less than four light sources could be used.

Further, in accordance with preferred practice, the beginning frames in a shooting sequence are identified by two groups of binary number 15 (1,1,1,1 1,1,1,1). Of course, if a different number of light sources are used, then a different binary number will identify the first frame of a sequence. Also, a different binary number, such as 0,0,0,0 or 0,1,0,1 etc. could be used with the four track system. However, preferably, the beginning frames are identified by two groups of the all ones states of the light sources. In the embodiment described below, the all ones state refers to the state in which all sources are activated. The same information could be conveyed with all sources deactivated. In the first case, the film edge would contain four parallel exposures, while in the second case, there would be no exposures on the film edge.

Figure 2:
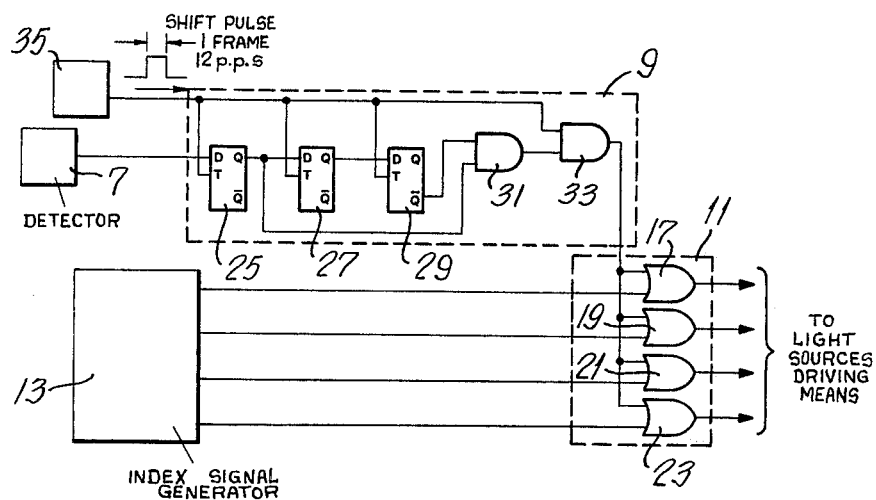
FIG. 2 is a schematic diagram of one embodiment of the invention.

FIG. 2 illustrates a circuit for implementing an all ones signal on a four track apparatus on the beginning frames of each shooting sequence. As can be seen, the means 9, shown enclosed by dotted lines, comprises three D-type flip-flops 25, 27 and 29. Each flip-flop comprises a data input terminal D, a trigger input terminal T and Q and $\overline{Q}$ output terminals. The output of the detector 7 is fed to the D terminal of the first flip-flop 25 whose Q output terminal is connected to the D terminal of the second flip-flop 27. In a like manner, the Q output terminal of 27 is fed to the D input terminal of the third flip-flop 29.

The means 9 further comprises two AND gates 31 and 33 each having two input terminals and an output terminal. The $\overline{Q}$ output of 29 is fed to one input of the first AND gate 31 while the Q output of the first flip-flop 25 is fed to the second terminal of 31. The output of 31 is fed as one input to AND gate 33.

Shift pulse generator 35 provides pulses at the frame rate of the camera and has an output connected to the T terminals of all the flip-flops as well as to the other input of the second AND gate 33.

The logic means 11, shown enclosed in dashed lines, consists of four OR gates 17, 19, 21 and 23. The output of AND gate 33 is fed to one input of the OR gates and the other input is fed from the index signal generator 13.

In operation, the system works as follows:

When a new sequence is about to be shot and the camera is turned on, the motor will initially run at speeds below the operating speed of the camera. The detector 7 monitors the motor speed, but provides an output only when the motor reaches the operating speed of the camera. At this time, a logical high is applied to the D terminal of flip-flop 25, and this high will be shifted into the flip-flop 25 when flip-flop 25 is triggered by the next shift pulse from shift pulse generator 35. This provides a logical high at the Q output terminal of flip-flop 25 so that gate 31 is opened (the $\overline{Q}$ terminal of flip-flop 29 is high because 29 is in its untriggered state), which in turn opens gate 33 to pulses from the shift pulse generator 35.

The shift pulses are thus applied to the inputs of OR gates 17, 19, 21 and 23, so that a high output is provided at the outputs of these gates no matter what appears at their other inputs. The high at the output of the gates is fed to the light source driving means which drives all sources having a high at their respective gates.

On the second shift pulse, the high of flip-flop 25 will be shifted to flip-flop 27 and gates 31 and 33 will remain open. However, on the third shift pulse, the high will be shifted to flip-flop 29 so that its $\overline{Q}$ terminal will go low. This will, of course, close gate 31 which will, in turn close gate 33. Thus, no more shift pulses will be fed to the OR gates, and the outputs of the OR gates will correspond to their inputs from the index signal generator 13.

The time occupied by one shift pulse, and the interval between that one shift pulse and the next shift pulse are each equal to the time of one frame on the film. Thus, when the first shift pulse passes through AND gate 33, it will cause the LEDS to be activated in the first frame of the shooting sequence. The second frame will be empty as it corresponds to the interval between pulses. The second shift pulse will cause the LEDS to be activated during the third frame, and the fourth frame will be empty. The fifth frame will contain indexing information.

It will be obvious that, in order to provide the beginning frames identification code for more than four frame periods, it is merely necessary to add the appropriate number of D-type flip-flops between flip-flops 27 and 29 — one for each additional two frame period.

In order to provide an all zeroes first frame identification code, it is merely necessary to substitute a NAND gate for AND gate 33 and AND gates for OR gates 17 to 23. With this set-up, when AND gate 31 has a high at its output, to provide a high at one input to the NAND gate, and when a high is provided at the other input to the NAND gate by the frame pulse generator, the output of the NAND gate will be a low logic level, thus inhibiting the AND gates in the logic means 11. At all other times, the output of the NAND gate is high opening the AND gates in 11 to signals from the index signal generator 13.

The system could be easily modified to provide a beginning frames identifying code which contains both zeroes and ones. Thus, if the code were, for example, 0,1,0,1, the OR gates 17 and 21 would be replaced with AND gates and be fed, from AND gate 33, through an inverter. As 33 is low under normal conditions, the AND gates replacing 17 and 21 would be kept open during the normal conditions by the high at the output of the inverters. When 33 goes high, the outputs of the inverters would inhibit the AND gates replacing 17 and 21 to provide zeroes at their appropriate light beams.

Although several embodiments have been described above, this was for the purpose of illustrating, but not limiting, the invention. Various modifications, which will come readily to the mind of one skilled in the art, are within the scope of the invention as defined in the appended claims.

I claim:

1. A system for recording an identification code on the beginning frames of a shooting sequence on a film in a movie camera, and used in conjunction with a multi-track format apparatus for exposing indexing information on the edge of said film;

said camera comprising a driving motor;
said apparatus comprising a source with a plurality of light sources placed adjacent the film edge and disposed across said film edge; and
said system comprising, detecting means for detecting the speed of said driving motor;
said detecting means providing a driving signal when the driving motor reaches its operating speed;
light source activating and elapsed frame counting means connected to said detecting means for connecting an activating signal to at least one of said plurality of light sources for a predetermined number of frame periods on reception of said driving signal and for counting frames elapsed after the activating signal has been connected;
said activating signal being disconnected from said at least one of said plurality of light sources after said predetermined number of frame periods, and during alternate frame periods within said predetermined number of frame periods.

2. A system as defined in claim 1 wherein said plurality of light sources is equal to four light sources whereby said apparatus comprises four track apparatus.

3. A system as defined in claim 2 wherein an inhibiting signal is connected to said beams to which said activating signal is not connected, whereby, when said beams which are activated are activated, the remainder of said beams will be inhibited.

4. A system as defined in claim 3 wherein said predetermined number of frame periods is equal to four frame periods.

5. A system as defined in claim 2 wherein said activating signal is connected to all of said four beams, whereby said identification code is 1,1,1,1 1,1,1,1.

6. A system as defined in claim 5 wherein said detecting means comprises a tachometer.

7. A system as defined in claim 6 wherein said light sources comprise LEDS.

8. A system as defined in claim 7 wherein said first frame identifying means comprises three D-type flip-flops, each said flip-flop comprising a data input terminal, a trigger input terminal and Q and $\overline{Q}$ output terminals;

said first frame identifying means further comprising two two-input AND gates;
said system further comprising a shift pulse generator;
the output of said detecting means being connected with the data input terminal of a first one of said three flip-flops;
the Q output terminal of said first flip-flop being connected to the data input terminal of a second one of said three flip-flops;
the Q output terminal of said second flip-flop being connected to the data input terminal of a third one of said three flip-flops;
the $\overline{Q}$ output terminal of said third flip-flop being connected to one input terminal of a first one of said two AND gates;
the Q output terminal of said first flip-flop being connected to the second input terminal of said first AND gate;
the output terminal of said first AND gate being connected to one input terminal of a second one of said two AND gates;
the output terminal of said shift pulse generator being connected to the second input terminal of said second AND gate;
the output terminal of said shift pulse generator being further connected to the trigger input terminals of said first, second and third flip-flops;
the output terminal of said second AND gate being connected to said sources to activate said sources when an output appears at the output terminal of said second AND gate.

* * * * *